Aug. 9, 1932.    C. R. ECKERT    1,870,841
PIPE COATING APPARATUS
Filed Jan. 21, 1930    2 Sheets-Sheet 2
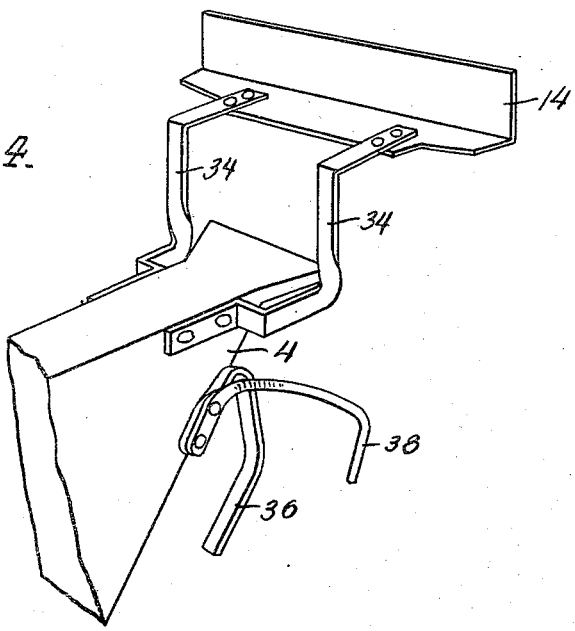
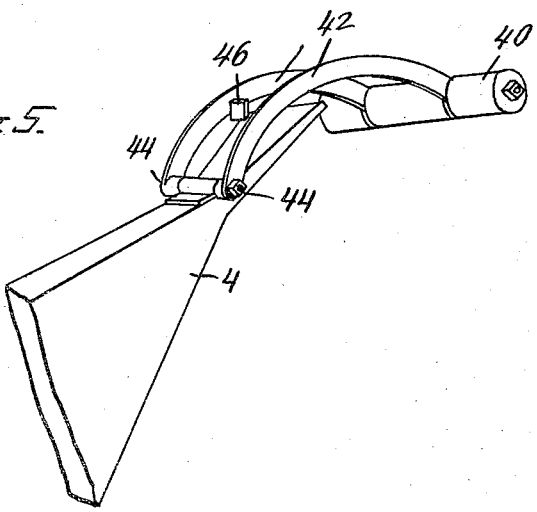
INVENTOR
Clarence R. Eckert
BY
ATTORNEY

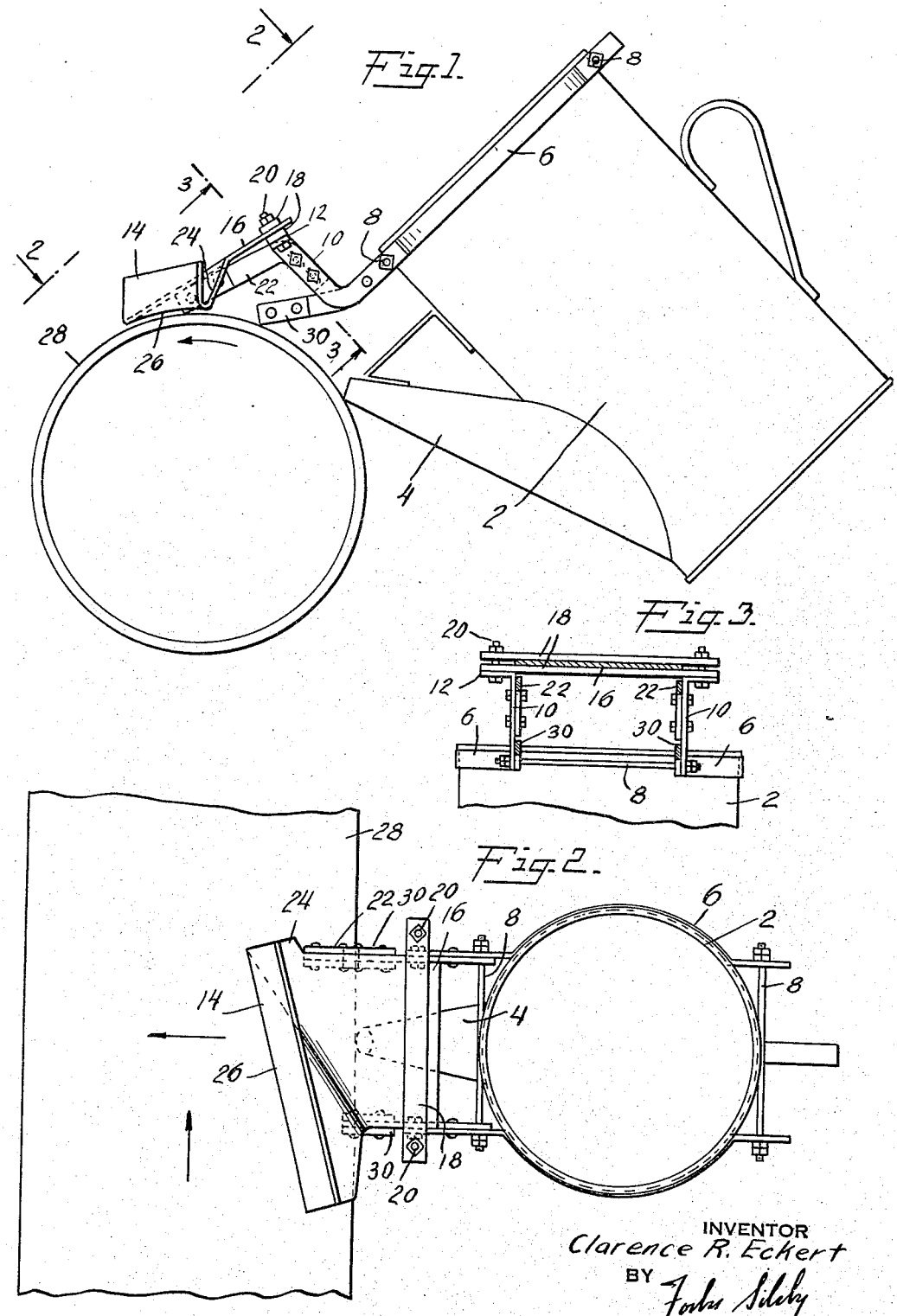

UNITED STATES PATENT OFFICE

CLARENCE R. ECKERT, OF ENGLEWOOD, NEW JERSEY, ASSIGNOR TO THE BARRETT COMPANY, OF NEW YORK, N. Y., A CORPORATION OF NEW JERSEY

PIPE COATING APPARATUS

Application filed January 21, 1930. Serial No. 422,332.

My invention relates to the coating of pipe or similar cylindrical articles and particularly to a device for applying a layer of protecting material to the surface of pipes, posts, columns and similar elongated cylindrical articles, whether formed of metal, wood, or other substances, to prevent corrosion or deterioration thereof.

In laying pipes for pipe lines and similar systems, especially when the pipe is laid in the ground or in inaccessible places, it is important that the outer surface of the pipe be protected from corrosion or deterioration by the action of water and the elements in order that the life of the pipe may be as long as possible so as to avoid the expense and delay incident to repairing the pipe line due to frequent failures of sections of the pipe. Posts, columns and other cylindrical members are frequently coated with protecting material or surface layers of predetermined thickness for preserving the same or for decorative or other purposes.

The primary object of my invention is to provide a simple, cheap, and effective device for coating cylindrical articles by the use of which a layer of material may be easily and uniformly applied to the surface of a pipe, post, column, or other cylindrical article.

This and other objects and features of my invention will appear from the following description of the preferred forms of apparatus suitable for use in applying coating material to the pipes.

In accordance with my invention, I provide a simple device for applying coating material to the surface of a cylindrical member such as a pipe constructed with an integral screed or spreader for forming the material into a layer of the desired thickness, the screed being positioned at a fixed distance from the point of application of the material to the pipe. The application of the material to the pipe and the application of the screed or spreader to the material to form it into a smooth layer is effected approximately simultaneously so that material is not applied to the pipe when the spreader member is not in position to form the material into a layer of the desired thickness. The position of the member with reference to the pipe and therefore the thickness of the layer of material may be maintained substantially constant so that the layer of coating material on the surface of the pipe is of substantially uniform thickness. Relative movement of the pipe and means for applying material is effected, as by rotating the pipe, so that the material on the surface of the pipe is moved from the point of application directly into contact with the spreader member and formed into a smooth layer of the desired thickness.

In order that my invention shall be more clearly understood, I will describe certain preferred types of mechanism, although the devices embodying my invention are not limited to construction of the devices hereinafter described.

In the accompanying drawings,

Fig. 1 is a side view of one type of mechanism suitable for use in applying coating material to a pipe and forming the material into a layer;

Fig. 2 is a view of the form of the device illustrated in Fig. 1 as seen from the line 2—2;

Fig. 3 is a sectional view illustrating a detail of the device illustrated in Fig. 1 taken on the line 3—3;

Fig. 4 is a perspective of a portion of a modified form of the device, and

Fig. 5 is a perspective of a further modification of the invention.

In the form of the device illustrated in Fig. 1, the material which is to be supplied to the surface of the pipe, post, column or other member to be coated, and which may be pitch, enamel, or any other suitable material is supplied to a receptacle 2 in the form of a fluid. If the material is pitch it is preferable that it should be hot in order that it may flow readily. The receptacle illustrated is in the form of a portable can provided with an outlet or spout 4 through which the coating material passes in being applied to the pipe. Bands of metal 6 shaped to fit the receptacle are located on each side thereof and secured thereto by bolts 8 in the front and rear of the can. The bands 6 extend in front of the receptacle and are turned upwardly at 10 for a suitable distance and then turned outwardly at their upper extremities to form supports 12.

A spreader 14 is carried by the supporting arms 12 and is provided with a portion 16 clamped in position between the strips 18 located above and below the portion 16 and secured to the supports 12 by bolts 20 passing through the members 18 and the supports 12. From Fig. 1, it will be noted that the spreader 14 is spaced vertically above the discharge outlet of the spout 4 and horizontally away from the discharge outlet with respect to the point of connection between the spout 4 and the pouring bucket. Members 22 are secured to the upwardly extending portions 10 of the bands 6 and project forwardly thereof beneath the portion 16 of the spreader 14 to provide further support for the spreader. The spreader 14 is provided with a spreading portion 24 having a spreading edge 26 for engaging the coating material to form it into a smooth layer of substantially uniform thickness. The portion 24 is suitably shaped to engage the coating material throughout its width and to prevent excess coating material from passing beneath the edge 26. The edge 26 of the portion 24 may be curved somewhat to conform to the curved surface of the pipe 28 to be coated. The portion 24 of the spreader 14 which engages the coating material is positioned at an angle to the axis of rotation of the pipe, so that the excess or unevenly distributed coating material is forced laterally to some extent as the pipe 28 is rotated, thereby producing a smooth surface on the coating material.

The members 22 carried by each of the arms 10 bear directly on the surface of the pipe and an additional member 30 is provided (on the right-hand side of the device as illustrated in Figs. 1 and 2), which also bears against the surface of the pipe. These members act as positioning elements for locating the spreader 14 and the spreading portion 24 thereof with reference to the pipe. In this way the spreading edge 26 of the spreader 14 is continually held at a fixed distance from the surface of the pipe so that the material is formed into a layer of substantially uniform thickness throughout. The portion 24 of the spreader 14 extends considerably to one side of the members 22 (to the left as seen in Figs. 1 and 2) so that if the members 22 or 30 engage the coating material and form any depression or scoring therein, the lateral extension of the member 24 will wipe out such marks, leaving the surface with a smooth finish.

In the form of the device illustrated in Fig. 4, the spreader member 14 is secured directly to the spout 4 by means of angular supporting arm members 34. Positioning members 36 and 38 are secured to the lower portion of the spout to engage the pipe to be coated at a point below or rearwardly of the point of application of the coating material to the pipe. The member 36 extends toward the pipe in the same plane as the spout 4 and the member 38 extends laterally of the spout to prevent lateral displacement of the receptacle 2 and spreader member 14 when the device is in use. This form of the device is of advantage in that there is no danger that the positioning members will form depressions in the coating material after it is applied to the surface of the pipe. Furthermore, the thickness of the layer of coating material may be controlled as desired by tilting the receptacle about the positioning members 36 and 38 so as to bring the spreader member 14 close to the surface of the pipe or to space the member further away from the surface of the pipe.

In the form of the invention illustrated in Fig. 5, the spreader member is in the form of a cylindrical piece of wood or metal 40 pivotally secured to the spout 4 by means of the arms 42 and the pivots 44. In this form of the invention the spreader 40 engages the material applied to the surface of the pipe and spreads it into a smooth layer. The member 40 being pivotally connected to the receptacle bears against the pitch by gravity and since the weight of the member 40 and the consistency of the coating material normally remain substantially constant, the thickness of the layer of material applied to the surface of the pipe will be substantially constant. A stop member 46 may be secured to one of the arms 42 to engage the spout 4 and prevent the spreader and arms from dropping too far down when the device is not in use. This form of the device is of advantage in that no positioning members are necessary for maintaining the spreader or the receptacle in the desired position with reference to the pipe, and the receptacle may be tilted at will to empty the contents of the can onto the pipe without altering or affecting the force with which the spreader 40 bears against the layer of coating material applied to the pipe. Thus, the thickness of the coating of material will remain substantially constant without particular care on the part of the operator to maintain the members in any specific position.

In employing any of the above described devices, the pipe or other cylindrical member to be coated is rotated in the direction indicated by the arrow (Fig. 1). The receptacle 2 is then brought into position and tilted so as to cause the coating material to flow from spout 4 onto the surface of the pipe. The spreader member carried by the receptacle is simultaneously brought into position to engage the coating material applied from the receptacle. The material carried on the surface of the pipe passes from the point of application toward and into contact with the spreader member and is smoothed out and may be moved laterally to some extent so as to form the material into a smooth layer of substantially uniform thickness. If the form of the device illustrated in Fig. 4 is employed, the thickness of the layer of the material may be readily controlled by movement of the receptacle so as to control the spacing of the spreader member 14 from the surface of the pipe being coated.

When the pipe has been coated as desired, the receptacle or can is tilted back into its vertical position to stop the flow of material onto the pipe, thereby moving the spreader member out of contact with the material applied to the surface of the pipe. In this way the spreader member is maintained in contact with the coating material as long as the material is being applied to the pipe but, as soon as the flow of material onto the pipe is stopped, the spreader member is removed from engagement with the coating material. Movement of the receptacle thus controls movement of the spreader member into and out of contact with the material applied to the pipe.

With any of the devices illustrated and described above, the coating material may be quickly and easily applied to the pipe by one operator and without the danger and uncertainty resulting from the use of two operators each of whom acts independently of the other in carrying out the two operations of applying material to the pipe and spreading the material into a smooth layer after it has been applied to the pipe. Furthermore, the coating material which may be pitch may be heated to a high temperature without danger of injury to the operator since the spreader member is not handled directly by the operator as has been the case in processes heretofore suggested.

Although the invention has been described as carried out by the use of preferred devices for applying and spreading coating material to the surface of the pipe, it is not intended that the invention should be limited to the specific details of the devices herein described, since many modifications and changes in construction and arrangement of parts may be made without departing from the invention as set forth in the claims.

I claim:

1. A pouring bucket adapted for applying to and spreading liquid coating material about a rotating pipe, comprising a receptacle for the coating material having a spout through which coating material may be poured onto the pipe, a spreading member mounted on said pouring bucket and positioned in front of said spout in position to engage the coating material on the pipe to form the coating material into a smooth layer when the receptacle is tilted to pour the coating material onto said pipe, and a positioning member on said pouring bucket arranged to contact with the rotating pipe to carry the weight of said pouring bucket.

2. A pouring bucket adapted for applying to and spreading coating material about a rotating pipe comprising a receptacle for the coating material having a spout projecting from a side thereof through which coating material may be poured onto the pipe in a stream, a handle on the side of the receptacle opposite to that containing the spout by which the receptacle may be carried and tilted to pour coating material from the spout, supporting arms secured to the sides of said receptacle, at each side of the receptacle projecting forwardly therefrom, a positioning member secured to the receptacle arranged to contact with the rotating pipe to carry the weight of said receptacle, and a spreader carried by said supporting arms extending between said supporting arms and positioned in front of said spout, said spreader being movable with the receptacle into position to engage the coating material and form the same into a smooth layer of substantially uniform thickness when the receptacle is tilted to pour coating material onto said pipe.

In witness whereof, I have hereunto set my hand.

CLARENCE R. ECKERT.